Feb. 23, 1954   B. DOMS   2,670,053
CABINET FOR LOUDSPEAKERS AND THE LIKE
Filed Feb. 7, 1950   3 Sheets-Sheet 1

INVENTOR
BENEDICT DOMS
BY
ATTORNEYS

Feb. 23, 1954  B. DOMS  2,670,053
CABINET FOR LOUDSPEAKERS AND THE LIKE
Filed Feb. 7, 1950  3 Sheets-Sheet 2

INVENTOR
BENEDICT DOMS
BY
ATTORNEYS

Feb. 23, 1954     B. DOMS     2,670,053
CABINET FOR LOUDSPEAKERS AND THE LIKE
Filed Feb. 7, 1950     3 Sheets-Sheet 3

INVENTOR
BENEDICT DOMS
BY

ATTORNEYS

Patented Feb. 23, 1954

2,670,053

UNITED STATES PATENT OFFICE 2,670,053

CABINET FOR LOUDSPEAKERS AND THE LIKE

Benedict Doms, Deurne-Sud, Belgium

Application February 7, 1950, Serial No. 142,770

4 Claims. (Cl. 181—27)

My invention has for its object important improvements in arrangements and cabinets for loud speakers associated or not with a wireless set, a gramophone pick-up, a sound film or wire apparatus and/or a television apparatus.

These improvements have for their chief object the execution of a transmission of sound with the highest possible instrumental and vocal fidelity. My invention is chiefly characterized by the fact that said cabinet is designed for the double purpose of forming a complete acoustic instrument of almost absolute perfection in order to display, after the manner of an orchestra, the different sounds produced; executing said piece of furniture practically in the usual accepted sizes and shapes.

It is obviously possible to incorporate said improvements in various manners and to apply them to different forms of cabinets.

By way of exemplification and without any limitation as to the possible application of the improvements forming the object of my invention, I will now describe certain embodiments that are illustrated diagrammatically in accompanying drawings, wherein.

Figures 1, 2, 3:
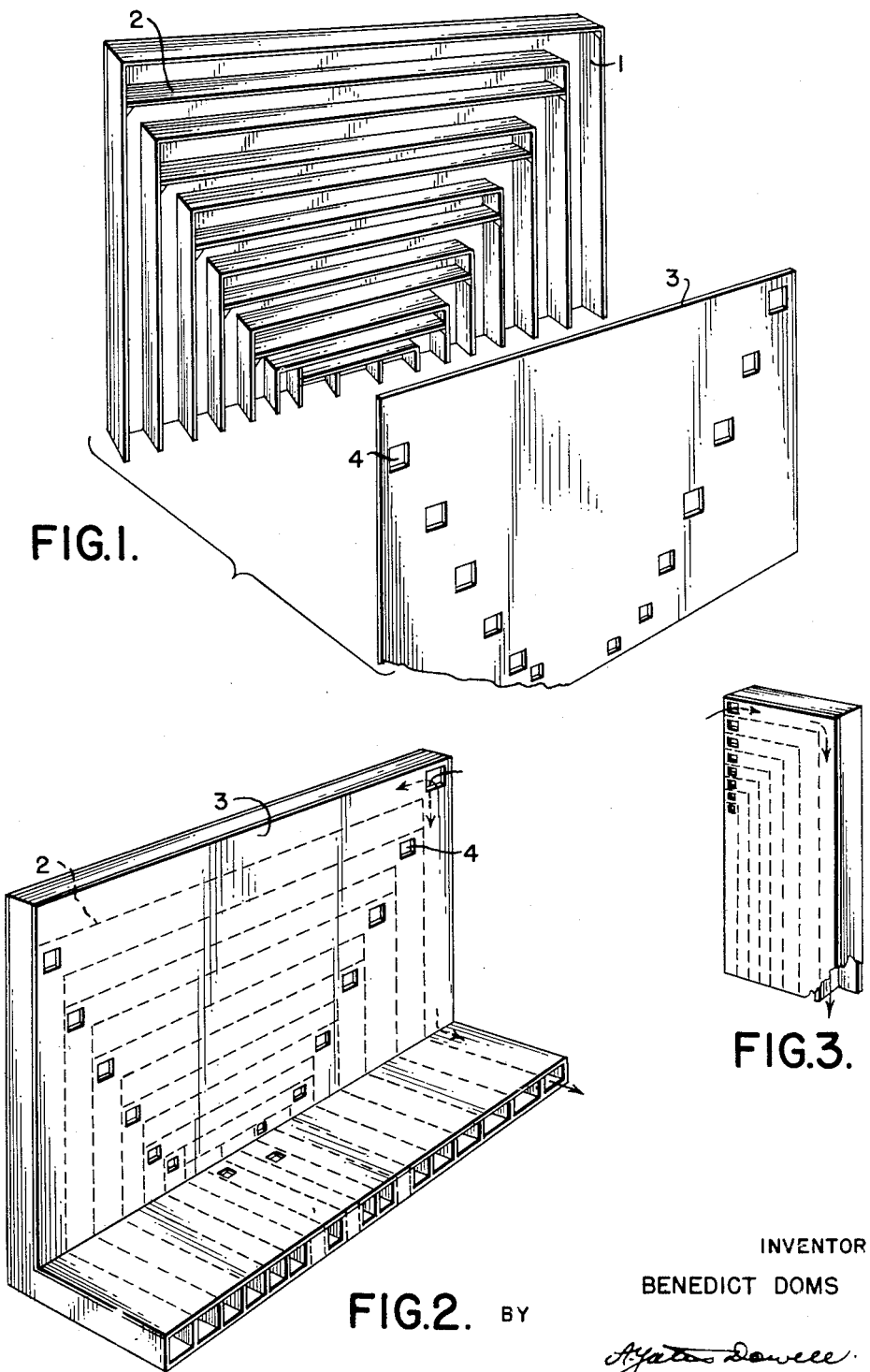
Fig. 1 is an exploded view in perspective of the rear double wall of the cabinet.
Fig. 2 is a perspective view of the same rear wall, complete and associated with the lower wall of the cabinet.
Fig. 3 is a perspective view of a side wall of the cabinet according to the invention.

Turning to Figs. 1 and 2, the rear wall of the cabinet generally associated with the lower wall is constituted by a plate 1 to which are secured strips or partitions such as illustrated at 2, that define right-angled passages or channels arranged in opposed directions, in other words, the apex of one bent passage is located at a point opposed to the location of the apex of the adjacent bent passage and so on throughout the rear wall over which said bent passages are distributed from the center of the bottom line towards the sides and upper end. This assembly of channels is covered by a second plate 3 defining the acoustic box and provided with a series of ports 4 adapted to register respectively with the bends of the different passages or compartments defined between the strips 2. I obtain thus a double walled box partitioned inwardly to form the successive passages bent in opposite directions and provided with an individual inlet in register with the bend. It will be noticed that for each bend the bourdon stop extends over one half of the length of the pipe formed by the passage whereby each pipe produces in practice a predetermined acoustic length and its octave. It is thus possible to provide a low reflex or multi-low reflex transmission.

It is therefore possible to design a rear wall of this type in accordance with the result that it is desired to achieve. It is sufficient to apply the general principle that consists in using for the periphery a suitable acoustic length and to consider that in each successive bent passage, there is lost the difference in actual length between two consecutive tones in a manner such that each pipe assumes an actual length that corresponds to the desired note and the value of which diminishes from one tube to the next.

Figure 4:
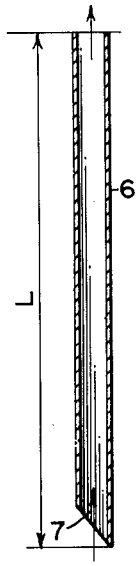
Figs. 4, 5 and 6 illustrate diagrammatically in longitudinal cross-section respectively a conventional organ tube, a simple organ tube for an organ bourdon stop according to the invention, and a double organ pipe of the bourdon stop type also according to the invention.

The lateral surfaces may be designed in a similar manner or else it is generally of advantage to design them in the shape of simple pipes without any bourdon stops as illustrated diagrammatically in Fig. 4.

It may be of advantage, in fact, to provide the two lateral walls with a difference of one half tone.

In the example illustrated in Figs. 1, 2 and 3, the partitioning of the rear, lower and lateral walls into pipes is executed in a manner such that the openings of the different pipes are directed towards the middle of the cabinet.

Figure 7:
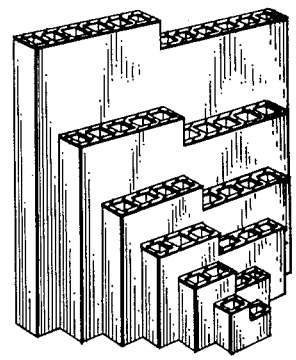
Fig. 7 is a partial perspective view of an embodiment of the front wall of the cabinet.
Figure 8:
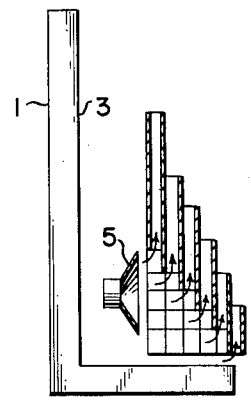
Fig. 8 is a diagrammatic cross-section illustrating the association of the loud speaker with the front wall of the cabinet and showing one location of the rear and bottom panels with parts omitted.
Figure 10:
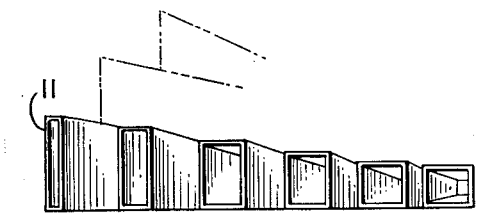
Figs. 10 and 11 illustrate respectively in elevational and plan views an embodiment of the front part of the cabinet.
Figure 9:
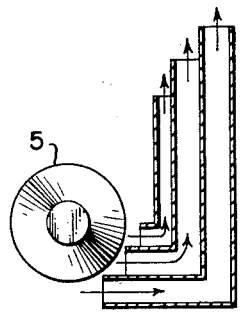
Fig. 9 is a transversal partial cross-section of the front of the cabinet.
Figure 11:
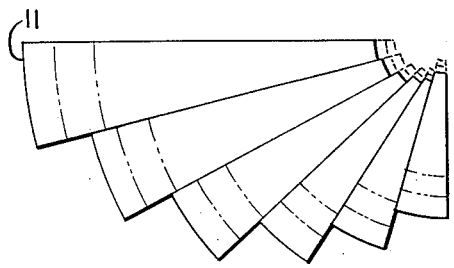
Figure 12:
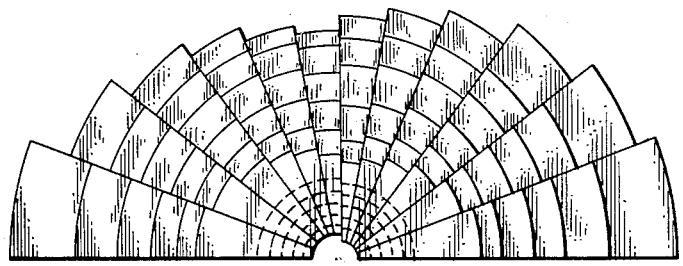
Figs. 12 and 13 illustrate diagrammatically in elevational and in plan views a baffle board incorporating the arrangement of Figs. 10 and 11.
Figure 13:
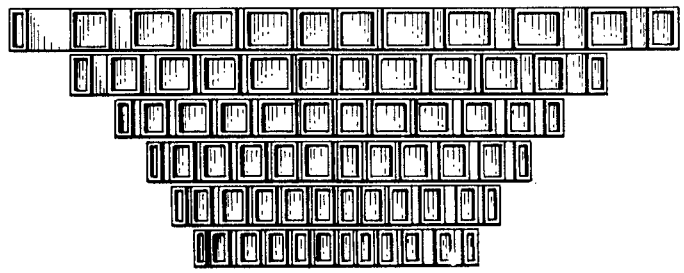

Said cabinet is completed by the arrangement at its front of a system of pipes registering with the loud speaker 5 and cooperating with the resonating elements forming the walls as described hereinabove (Figs. 7, 8 and 9).

It is essential to notice that the partitioning of the walls is such that most of the pipes have an acoustic length that is substantially increased through the novel arrangement of the openings in the lateral wall of the organ pipe at a point that increases the acoustic length in an accurate and harmonic manner. In fact, as illustrated diagrammatically in longitudinal cross-section in Fig. 4, an ordinary organ pipe 6 is substantially formed by a pipe that is open at both ends. In such ordinary pipes, the air passes through the passages thus formed throughout and the acoustic length is equal to the actual length L of the pipe.

Figure 5:
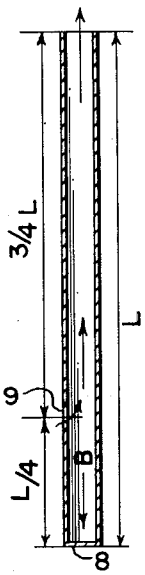

In contradistinction with this usual arrangement, I have closed one of the ends 8 of the pipes while the inlet of air 9 is provided in the lateral wall thereof. Consequently, this provides a pipe the acoustic length of which is substantially increased and thereby I provide easy means for considerably reducing the bulk of the acoustic pipes which allows executing cabinets the size of which is substantially that generally admitted for such cabinets while retaining, however, a much more considerable range of acoustic operation. As a matter of fact, if I consider (Fig. 5) a tube having a length L arranged according to my invention, the entrance 9 into which is located at ¼ of the length of the pipe, I obtain an acoustic length equal to ⅔ L; through a suitable location of the air entrance 9, it is thus possible to define mathematically the acoustic length of any pipe in the arrangement and to form a musical scale with said pipes.

Figure 6:
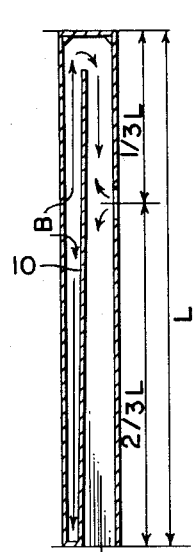

It is also possible, without modifying the longitudinal bulk of the tube, to increase this acoustic length still more through a duplication of the tube as illustrated in longitudinal cross section in Fig. 6. As a matter of fact, the tube is longitudinally subdivided by a partition 10 defining a bent pipe the length of which is somewhat double that of the original pipe while the acoustic length is multiplied by a greater factor by reason of the fact that if in this case again the inlet of air 9 is located at say ⅔ of the tube, the acoustic length will be equal to ⅘ of the material length.

It will consequently be very easy to design the walls of the cabinet in order to obtain an optimum result without increasing the bulk of the cabinet as it is possible to define, as desired, the acoustic length of the different pipes and the setting and distribution of said pipes.

It is possible, in certain cases, to design the front wall of the cabinet as illustrated more particularly in accompanying Figs. 10 to 13 chiefly for reproducing sounds within the range of the violin and/or viola. Through this arrangement, the sound is diffused in all directions towards the front of the cabinet and sweeps space inside a solid angle that may range between 30 and 180°. This extreme angle of 180° may be reduced in accurate conformity with the breadth of the premises in which the sound is to be produced.

In the embodiment illustrated, the compound system includes e. g. 24 conical or pyramidal juxtaposed channels 11 that are gauged e. g. so as to produce a relationship of minor thirds. The layers or channels are superposed and gauged in accordance with the major chord of the longer channel.

This arrangement of the front wall furthers synchronization of the harmonics through the action of simultaneous mechanical resonances in the dividing walls of the compound system thus executed. Said system allows obtaining full and harmonic sounds in all tonalities by reason of the fact that the largest number of possible chords is produced in such channels separated by dividing walls so that they assist one another.

Obviously, the number and arrangement of such pipes having a gradually varying cross section, are capable of being adapted to any practical case of execution.

Figure 14:
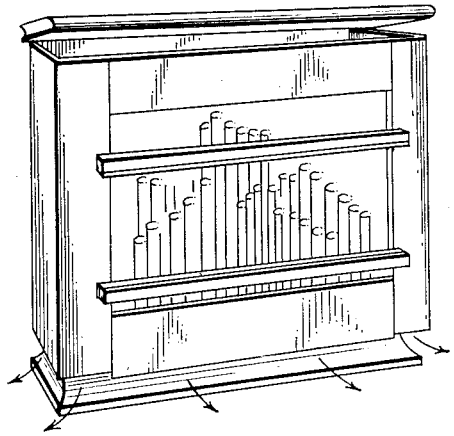
Fig. 14 is a general perspective view of a cabinet executed according to my invention.

In Fig. 14, the arrangement of the foot 12 of the cabinet will be noticed, that forms a diffusor cooperating with the adjacent openings of the different acoustic tubes, which leads thus to a rational diffusion of all the sounds transmitted by said acoustic tubes.

In conformity with the invention, it is possible to incorporate one or more of the above improvements to cabinets or the like arrangements of any type or size that are intended for the production of sounds of any kind produced at a well defined transmission point as is always the case for loud speakers transmitting broadcast music.

It is also possible to provide for the partitioning of the walls in any manner suitable for the purpose that has just been defined. Lastly, it is possible to select any desired material for the cabinet, that is consistent with the known requirements of acoustics.

Such improvements transform the spherical waves formed by the loud speaker into transversal waves that damp one another in a harmonic manner. They enhance thus the sonority and brilliancy of each individual sound and also the color and relief of any instrument. They restore the specific tone and lights and shades of the different instruments in the simultaneous reproduction of their sounds and give a new life to the orchestral coloring.

They diffuse sound waves in a uniform smooth, pleasant and expressive manner giving full value to each note and they enhance the listening value and the artistic and educational action of the concerts transmitted by the loud speaker.

What I claim is:

1. An acoustical cabinet for high fidelity sound reproduction including front, rear, bottom and side walls, said rear wall comprising spaced front and rear panels, spaced horizontally and vertically disposed partitions between said panels, said partitions cooperating to form rectangular passages of progressively different lengths closed at one end and open at the other, said bottom wall comprising spaced upper and lower panels, spaced substantially parallel partitions between said upper and lower panels forming rectangular passages communicating with the open ends of said passages in said rear wall to increase the length thereof, apertures of predetermined sizes in said front panel and said upper panel, each aperture communicating with one of said passages in said rear and bottom walls at a predetermined location with respect to the length thereof, the length of said passages and the location and size of said apertures being so proportioned that said passages are resonant to a range of frequencies within the lower portion of the audible frequency spectrum, said side walls comprising spaced inner and outer panels, spaced horizontally and vertically disposed partitions between said inner and outer panels, said partitions cooperating to form rectangular passages of progressively different lengths closed at one end and open at the other, apertures of a predetermined size in said inner panel each of said last-named apertures communicating with a corresponding one of said last-named passages at a predetermined location, the length of said last-named passages and the location and size of said last-named apertures being so proportioned that said last-named passages are resonant to a range of frequencies within the middle portion of the audible frequency spectrum, said front wall comprising a plurality of vertically disposed tubes of progressively different lengths providing passages communicating at their lower ends with the interior of said cabinet and at their upper ends with the exterior of said cabinet, the length of said tubes being so proportioned that the passages provided thereby are resonant to a range of frequencies within the upper portion of the audible frequency spectrum, said tubes being so disposed as to disperse the relatively high frequency sound emanating therefrom through a relatively wide angle away from said front wall and a loud speaker disposed within said cabinet to excite the air columns within any or all of the said passages through the apertures in said front, upper and inner panels and the lower ends of said tubes whereby the sound emanating from said cabinet may cover substantially the entire audible frequency spectrum.

2. An acoustical cabinet for high fidelity sound reproduction including front, rear, bottom and side walls, said rear wall comprising spaced front and rear panels, spaced horizontally and vertically disposed partitions between said panels, said partitions cooperating to form rectangular passages of progressively different lengths closed at one end and open at the other, said bottom walls comprising spaced upper and lower panels, spaced substantially parallel partitions between said upper and lower panels forming rectangular passages communicating with the open ends of the passages in said rear wall to increase the length thereof, apertures of predetermined sizes in said front panel and said upper panel, each aperture communicating with one of said passages in said rear and bottom walls at a predetermined location with respect to the length thereof, the length of said passages and the location and size of said apertures being so proportioned that said passages are resonant to a range of frequencies within the lower portion of the audible frequency spectrum, said side walls comprising spaced inner and outer panels, spaced horizontally and vertically disposed partitions between said inner and outer panels, said partitions cooperating to form rectangular passages of progressively different lengths closed at one end and open at the other, apertures of a predetermined size in said inner panels, each of said last named apertures communicating with each of last-named passages at a predetermined location, the length of said last-named passages and the location and size of said last-named apertures being so proportioned that said last-named passages are resonant to a range of frequencies within the middle portion of the audible frequency spectrum, said front wall comprising a plurality of vertically disposed tubes of progressively changing length providing passages communicating at their lower ends with the interior of said cabinet and at their upper ends with the exterior of said cabinet, the length of said tubes being so proportioned that the passages provided thereby are resonant to a range of frequencies within the upper portion of the audible frequency spectrum and a loud speaker disposed within said cabinet to excite the air columns within any or all of said passages through the apertures in said front, upper and inner panels and the lower ends of said tubes whereby the sound emanating from said cabinet may cover substantially the entire audible frequency spectrum.

3. An acoustical cabinet for high fidelity sound reproduction including front, rear, bottom and side walls, comprising spaced front and rear panels, spaced horizontally and vertically disposed partitions between said panels, said partitions cooperating to form passages of progressively different lengths closed at one end and open at the other, said bottom wall comprising upper and lower panels, spaced partitions between said upper and lower panels forming passages communicating with the open ends of said passages in said rear wall to increase the length thereof, apertures of predetermined sizes in said front panel and said upper panel, each aperture comunicating with one of said passages in said rear and bottom walls at a predetermined location with respect to the length thereof, the length of said passages and the location and size of said apertures being so proportioned that said passages are resonant to a range of frequencies within the lower portion of the audible frequency spectrum, said side walls comprising spaced inner and outer panels, horizontally and vertically disposed partitions between said inner and outer panels, said partitions cooperating to form resonant passages of progressively different lengths closed at one end and open at the other, apertures of a predetermined size in said inner panels, each of said last-named apertures communicating with one of said last-named passages at a predetermined location, the length of said last-named passages and the location and size of said last-named apertures being so proportioned that said last-named passages are resonant to a range of frequencies within the middle portion of the audible frequency spectrum, said front wall comprising a plurality of vertically disposed tubes of progressively different lengths providing passages communicating at their lower ends with the interior of said cabinet and at their upper ends with the exterior of said cabinet, the length of said tubes being so proportioned that the passages provided thereby are resonant to a range of frequency within the upper portion of the audible frequency spectrum, said tubes being so disposed as to disperse the relatively high frequency sound emanating therefrom through a relatively wide angle away from said front wall, and a loud speaker disposed within said cabinet to excite the air columns within any or all of said passages through the apertures in said front, upper, and inner panels and the lower ends of said tubes whereby the sound emanating from said cabinet may cover substantially the entire frequency spectrum.

4. An acoustical cabinet for high fidelity reproduction of sound comprising bottom, rear and side panels forming an enclosure, each panel being formed of inner and outer walls, partitions between each wall of each panel forming passages with some of said passages extending in at least two of said panels and some of said passages in a single panel extending in two directions thereby increasing the effective length of said passages for obtaining resonance of the lower frequencies, said inner walls being provided with openings into each of said passages intermediate the ends of the passages, each of said passages being closed at one end, and sound reproducing means within the enclosure for producing vibrations which may resonate in the corresponding passage of said panels.

BENEDICT DOMS.

References Cited in the file of this patent

UNITED STATES PATENTS

| Number | Name | Date |
|---|---|---|
| 1,912,454 | Hutter | June 6, 1933 |
| 1,969,704 | Alton | Aug. 7, 1934 |
| 1,975,201 | Elworthy | Oct. 2, 1934 |
| 1,981,962 | Marriot | Nov. 27, 1934 |
| 2,172,871 | Giannini | Sept. 12, 1939 |
| 2,224,919 | Olson | Dec. 17, 1940 |
| 2,277,525 | Mercurius | Mar. 24, 1942 |